United States Patent [19]

Kasten et al.

[11] Patent Number: 5,042,160

[45] Date of Patent: Aug. 27, 1991

[54] TAPERED CALIPER GAUGE PAD

[75] Inventors: Mark Kasten, Mosinee, Wis.; James Foster; Gregory Weber, both of Manistique, Mich.

[73] Assignee: Measurex Corporation, Cupertino, Calif.

[21] Appl. No.: 375,259

[22] Filed: Jun. 30, 1989

[51] Int. Cl.$^5$ .............................................. G01B 3/00
[52] U.S. Cl. ................................ 33/501.02; 33/783; 33/834
[58] Field of Search ................ 33/501, 501.01, 501.02, 33/503, 559, 561, 831, 783, 501.03, 732, 783, 834, 835, 501.04; 73/159, 73; 19/300; 209/600, 601, 602; 324/229, 230, 231

[56] References Cited

U.S. PATENT DOCUMENTS

| | | | |
|---|---|---|---|
| 2,665,333 | 1/1954 | Dunipace et al. | 33/501.03 |
| 3,164,981 | 1/1965 | Knobel . | |
| 3,166,172 | 1/1965 | Kelsey et al. | 33/501.02 |
| 3,194,055 | 7/1965 | Knobel | 33/501.02 |
| 3,357,241 | 12/1967 | King, III | 73/159 |
| 3,528,002 | 9/1970 | Dunlavey | 324/34 |
| 3,818,327 | 6/1974 | Alexander . | |
| 3,828,248 | 8/1974 | Wennerberg | 324/34 |
| 3,855,524 | 12/1974 | Crawford . | |
| 4,041,378 | 8/1977 | Ott | 324/230 |
| 4,107,606 | 8/1978 | Typpo et al. | 324/229 |
| 4,107,847 | 8/1978 | Typpo et al. | 33/147 |
| 4,134,211 | 1/1979 | Typpo et al. | 33/147 |
| 4,271,699 | 6/1981 | Williamson | 73/159 |
| 4,292,838 | 10/1981 | Larsen | 73/37.1 |
| 4,574,634 | 3/1986 | Pappano | 73/159 |
| 4,587,849 | 5/1986 | Gross | 73/159 |
| 4,661,774 | 4/1987 | Montgomery . | |
| 4,724,384 | 2/1988 | Castovilly et al. . | |
| 4,739,249 | 4/1988 | Nyfors et al. | 324/58.5 C |
| 4,901,445 | 2/1990 | Boissevain et al. | 33/501.02 |

FOREIGN PATENT DOCUMENTS

| | | |
|---|---|---|
| 0299716 | 1/1989 | European Pat. Off. . |
| 160322 | 6/1983 | Fed. Rep. of Germany . |
| 2382673 | 9/1978 | France . |
| 45373 | 2/1962 | Poland . |

OTHER PUBLICATIONS

Co-pending U.S. patent application Ser. No. 07/339,506.
"What's the Plus in MicroPlus? The Most Detailed Profiles—Ever", Mar. 1989 Issue of *Pulp and Paper*, p. 71, place of publication unknown.
"Microscan Caliper Sensor (Contacting)", publication date unknown, bears 1989 U.S. Copyright Date, place of publication unknown.

Primary Examiner—Allan N. Shoap
Assistant Examiner—Alvin Wirthlin
Attorney, Agent, or Firm—Spensley Horn Jubas & Lubitz

[57] ABSTRACT

A contacting caliper gauge for measuring the thickness of a moving sheet. The gauge has two extendible members located opposite one another on opposite sides of the sheet. Each extendible member forces a caliper pad into contact with the sheet. Each pad is connected to the extendible member so that the rear portion of the pad exerts greater pressure on the sheet than the front portion. Each pad is also preferably tapered so that the rear end surface and the sheet contacting surface form a sharp edge at the rear of the pad and an angle of 90 degrees or less. Both the shape of the pad and its positioning with respect to the extendible member act to limit build up of adhesive material on the sheet contacting surface of the pads.

36 Claims, 4 Drawing Sheets

TAPERED CALIPER GAUGE PAD

BACKGROUND OF THE INVENTION

The present invention is directed to an apparatus and a system for measuring a physical property, such as thickness, of a sheet material. The present invention is more specifically directed toward a caliper gauge for measuring the thickness of a sheet of paper which is in the process of being manufactured by a papermaking machine and, therefore, is moving at a high rate of speed through the caliper gauge.

Various types of caliper gauges are known in sensor technology and are used for measuring the thickness of rapidly moving sheet material. One type of caliper gauge is called a "contacting caliper gauge." Contacting caliper gauges typically have two opposing pads which are forced into contact with opposite sides of the sheet. The distance between the pads is measured and directly related to the sheet thickness or "caliper."

Under some situations, however, contacting caliper gauges may suffer from certain shortcomings. For example, many modern paper mills now manufacture paper from wood pulp obtained from recycled materials, such as scrap magazines and discarded books. Such materials often contain glue, which originally functioned as a binding material to hold one edge of the papers together. It is generally too expensive to remove such glue from the recycled pulp during the papermaking process and, therefore, the glue ends up in the final product. Although the glue may not substantially degrade the quality of the final product, it causes formidable problems in obtaining accurate measurement of the caliper of the paper.

The problem of inaccurate caliper measurement is caused because paper mills manufacture paper at temperatures at which the glue is beginning to solidify. As the rapidly moving sheet passes between the opposing caliper pads, the hot glue rapidly builds up on the contacting surface of the pads forcing the pads away from the surface of the sheet. However, as previously mentioned, contacting caliper gauges determine sheet thickness based upon the measured distance between the opposing pads. Thus, the build up of the hot glue produces an inaccurate caliper measurement by making the sheet appear thicker to the caliper gauge than it actually is. In fact, conventional contacting caliper gauge designs often tend to form significant build up very rapidly. Obviously, this is entirely unacceptable when attempting to measure paper caliper to within 1 micron accuracy under a wide range of conditions, as is necessary in certain paper manufacturing situations.

Caliper designers have given little, if any, consideration to the overall shape of the caliper pads in preventing build up of glue on the sheet contacting surfaces of the pads. For example, conventional caliper pads have been essentially disk-shaped, with smooth, rounded edges to avoid snagging the sheet. However, the smooth rounded trailing edge of the pad provides a surface to which hot glue can initially adhere. This initial hot glue provides a slight obstruction on which more glue builds up. Additional glue then begins to form upstream (relative to the direction of sheet movement) from the obstruction on the sheet contacting surface of the pad. Eventually, the glue build up can occupy most, if not all, of the sheet contacting surface area, forcing the pad off of the sheet, thereby producing inaccurate measurements.

SUMMARY OF THE INVENTION

The present invention relates to a sheet caliper gauge for measuring the thickness of a sheet material while it is moving rapidly from the front to the rear of the gauge. The gauge comprises upper and lower pads disposed adjacent to, respectively, upper and lower surfaces of the sheet to be measured. The pads are held directly opposite each other, and each pad is forced against the sheet by an elastic extendible member, such as an inflated bellow. Because the elastic members place the pads in forcible contact with the rapidly moving sheet, it will usually be desirable to make the pads out of abrasion resistant material.

Each pad has a sheet contacting surface disposed substantially parallel to the sheet. However, the sheet contacting surface is preferably beveled or rounded near the front portion of the gauge so that the opposing pads together form a generally V-shaped guide for an entrance for the sheet material between the pads. This reduces the probability of tearing the sheet.

As previously explained, the build up of glue from the recycled material will tend to raise each pad off of the sheet surface. However, according to one aspect of the present invention, the tendency for glue to build up on the pads can be reduced or eliminated by applying a differential pressure on the pad so that the rear portion of the pad exerts greater pressure on the sheet than the front portion. This uneven pressure is believed to wipe any glue off of the pad before there is significant build up.

Many conventional pads have sheet contacting surfaces forming simple geometric shapes, such as a circle. According to the present invention, these conventional pads can be modified to achieve the differential pressure by removing part of the rear portion of the pad so that the area of the sheet contacting pad surface is offset with respect to a centerline of force transmitted through the extendible member.

Glue build up can also be minimized by forming each pad so that the rear end surface of each pad forms an angle of about 90 degrees or less with the sheet contacting surface of the pad. The rear end of the pad can be formed so that it has a substantially planar rear surface extending in the cross-direction (i.e., the direction across the width of the sheet perpendicular to the direction of sheet movement). The intersection of the cross-directional rear surface and the sheet contacting surface preferably form a sharp edge at the rear end of the pad.

Alternatively, or in combination with the rear cross-directional surface, the side surfaces of the pad extending from the front to the rear end of the pad can be tapered beginning at a location spaced from the rear end of the pad so that the cross-directional width of the pad decreases in size from that location to the rear end of the pad.

DETAILED DESCRIPTION OF THE DRAWINGS

Figure 1:
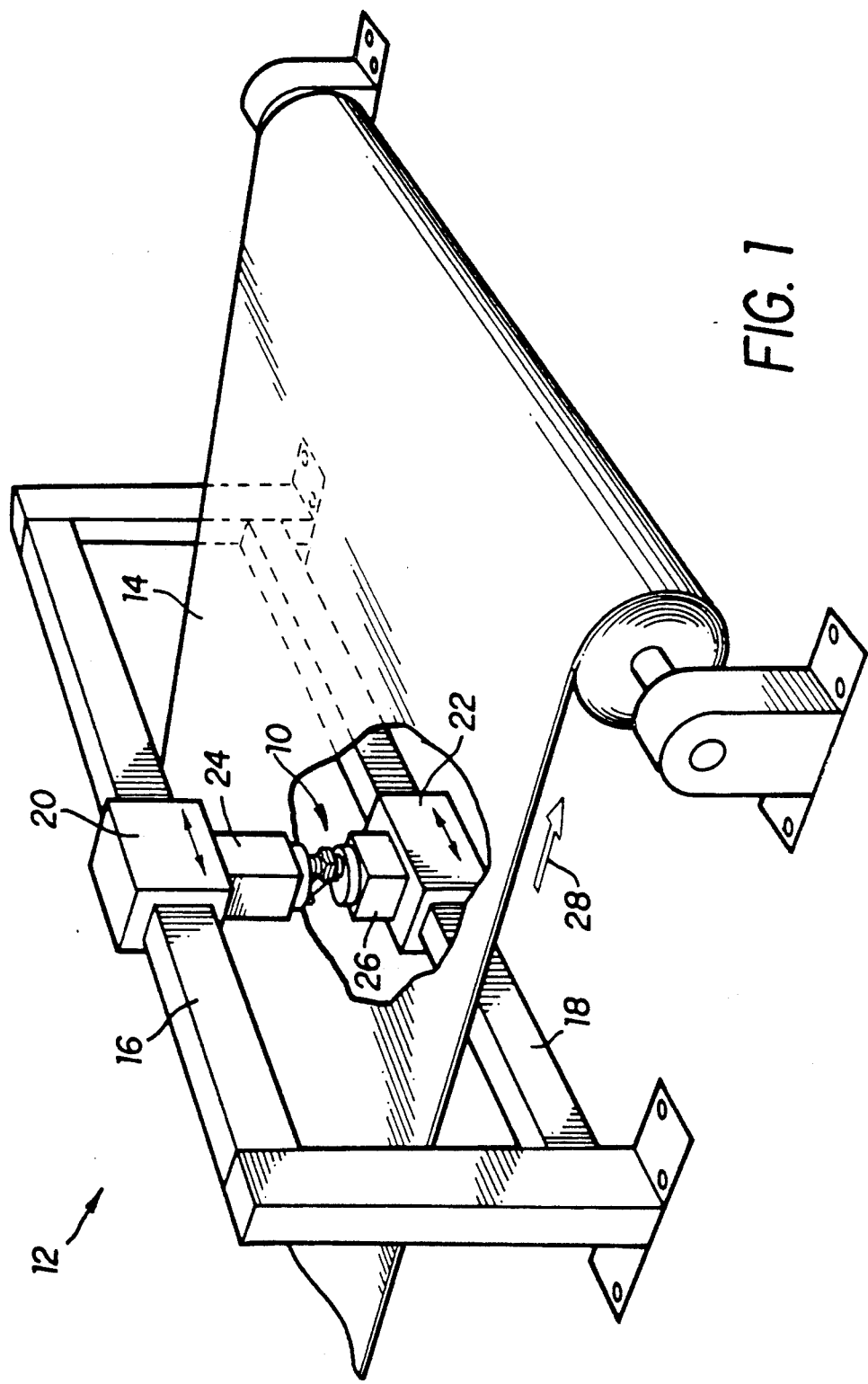
FIG. 1 is a simplified perspective view of a sheet scanning station having a caliper gauge mounted thereto for measuring sheet thickness immediately before the sheet is collected on a reel. Part of the sheet is removed to better illustrate the lower opposing portion of the caliper gauge.

FIG. 1 illustrates one embodiment of the sheet thickness or caliper gauge 10 of the present invention mounted to a scanner 12 which traverses or scans back and forth across the longitudinally moving paper sheet 14 being produced by a papermaking machine (not shown). The scanner 12 is of a now conventional type, such as that described in commonly assigned U.S. Pat. No. 3,621,259 to Mathew G. Boissevain. That patent is incorporated herein by reference.

The scanner 12 consists generally of a framework having a pair of spaced upper 16 and lower 18 beams and carriages 20, 22 which move back and forth across the beams 16, 18 in opposed relationship. The upper carriage 20 carries the upper head 24 of the caliper gauge 10, while the lower carriage 22 carries the lower head 26 of the caliper gauge 10. The two carriages, 20, 22, and thus the two caliper heads, 24, 26, are juxtaposed to provide a gap through which the paper sheet 14 freely moves. Although FIG. 1 merely shows the caliper gauge 10 used to measure paper thickness, the carriages 20, 22 would typically also carry additional devices for measuring various other physical characteristics of the paper sheet 14.

Figure 3:
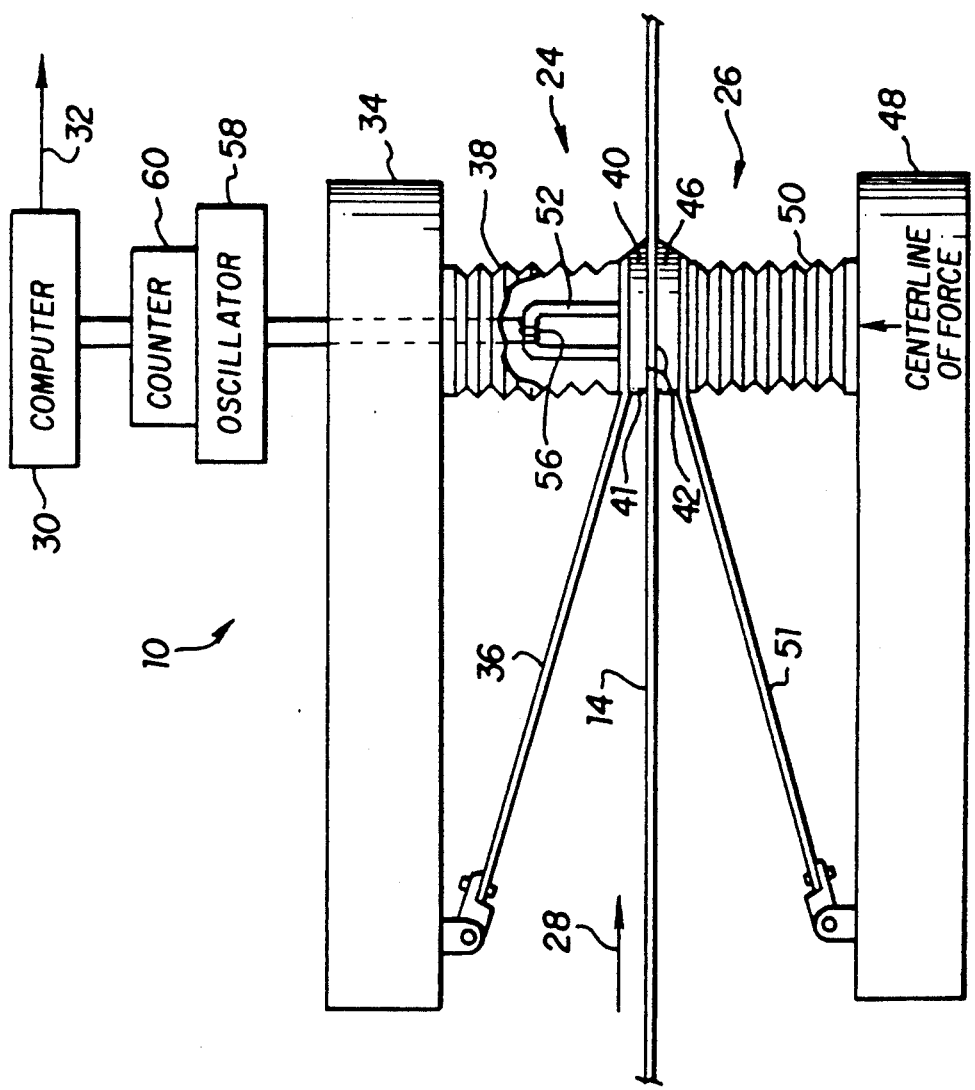
FIG. 3 is a schematic cross-sectional view of one embodiment of the caliper gauge of the present invention.

FIG. 3 illustrates, in partial cross-section, the upper and lower heads 24, 26 of the present caliper gauge 10. The paper sheet 14 moves rapidly between the upper and lower heads 24, 26 in the "machine-direction," i.e., the direction shown by the arrow 28. Thus, the paper sheet 14 moves from the front to the rear of the gauge.

As the caliper gauge 10 is scanned back and forth across the moving paper sheet 14, signals from the gauge 10 are provided, via signal processing circuitry, to the central paper machine process control computer 30. Utilizing these signals, the computer 30 computes a sheet thickness profile. The profile is then used by the computer 30 to adjust various sheet processing parameters to create a sheet having a desired uniform thickness. FIG. 3 illustrates that the output signals 32 from the computer 30 may be used to adjust various devices (not shown) on the papermaking machine to achieve the desired thickness.

The upper head 24 of the caliper gauge 10 includes a sturdy, relatively massive base 34 mounted to the upper carriage 20 (not shown in FIG. 3). One end of the support arm 36 is hinged at the front of this base 34. The other end of the support arm is hinged at the bellow 38. The bellow 38 connects the other end of the support arm 36 to the base 34 near the back of the gauge 10. The bellow 38 is disposed substantially perpendicular to the paper sheet 14. A sheet contacting pad 40 is attached to the distal end of the bellow. This pad 40 has a sheet contacting surface 42 which is parallel to the sheet 14 near the back of the gauge 10, and an inclined or rounded portion 41 at the front of the gauge 10 to guide the paper 14 between the pads 40, 46. When pressurized, the bellow 38 forces the pad 40 toward contact with the upper surface of the sheet 14.

The lower head 26 is similar in mechanical construction to the upper head 24. Like the upper head 24, the lower head 26 includes a second sturdy, relatively massive base 48, a second sheet contacting pad 46 and a second bellow 50. Each of these elements are connected in substantially the same manner as that described above for the upper head 24, except, of course, that the lower base 48 is mounted to the lower carriage 22 (not shown in FIG. 3).

As previously mentioned, the sheet 14 is moving rapidly between the caliper pads 40, 46. Thus, a rapidly moving boundary layer of air forms near the sheet surface and moves with the sheet 14. This causes air pressure to build up on the inner front surface of the upper and lower arms, 36 and 51, respectively. Such pressure would tend to raise the pads 40, 46 off of the sheet 14. However, the arms 36, 51 are designed with vent holes 37 (see, FIGS. 4–5) which allow the air to flow through the arms 36, 51, thus relieving the pressure and helping the pads 40, 46 to maintain contact with the sheet 14.

The upper and the lower heads 24, 26 are positioned so that the upper bellow 38 and the lower bellow 50 are in a substantially linear opposing relationship. However, the upper pad 40 and the lower pad 46 are shaped so that the area of the sheet contacting surface to the front of the centerline of force transmitted through each bellow is greater than the area of the sheet contacting surface to the rear of the centerline. Consequently, during operation of gauge 10, the rear portion of the sheet contacting surface of each pad exerts greater pressure on the sheet 14 than the front portion, thereby minimizing or preventing the formation of glue build up on the trailing edge of each pad.

In general, any extendible means could be used in place of each bellow. However, a bellow is preferred because at least a portion of the electro-magnetic circuit used to measure the thickness of the sheet material may be placed within the hollow interior of the bellow. One such circuit is fully described in commonly assigned U.S. Pat. No. 3,828,284 to Gunnar Wennerberg, which is incorporated herein by reference. Briefly, however, the caliper gauge 10 is equipped with an electro-magnetic proximity sensing device for accurately measuring the distance between the opposing pads 40, 46. This device includes an electro-magnet 52 mounted to the upper pad 40 and disposed within the upper bellow 38. This upper pad 40 is preferably formed of a highly abrasion resistant, non-magnetic material, such as sapphire. The lower pad 46 is formed of a magnetically susceptible abrasion resistant material, such as ferrite, preferably coated with sapphire or diamond on the sheet contacting surface 42.

The pads 40, 46 are preferably abrasion resistant to avoid excessive wear caused by the friction between the moving sheet 14 and the sheet contacting surfaces 42 of the pads 40, 46. It is particularly preferred that the upper pad 40 be abrasion resistant. This is because, as illustrated in FIG. 3, the electro-magnet 52 is mounted to the pad 40. The proximity sensing circuits are calibrated with the unworn pad. Therefore, if the sheet contacting surface 42 of the pad 40 is worn down, the poles of the electro-magnet 52 will move closer to the sheet 14 and produce an erroneous thickness measurement and possibly tear the sheet.

The coil 56 surrounding the core of the electro-magnet 52 may be electrically connected to an oscillator circuit 58 and used as the inductance of that circuit 58. Thus, movement of the magnetically susceptible ferrite pad 46 toward or away from the coil 56 with sheet thickness variation, changes the inductance of the coil 56 and hence the resonant frequency of the oscillator circuit 58. A frequency counter 60 is operatively coupled to the circuit 58 to determine its resonant frequency. The counter 60 then sends a signal to the computer 30 indicating this resonant frequency. The computer 30 computes the distance between the electro-magnet 52 and the ferrite pad 46, and hence sheet thickness, based upon this resonant frequency.

The present invention is well suited to the measurement of the thickness of paper derived from recycled materials containing adhesives. As described in greater detail below, the design of the pad minimizes and/or completely counteracts the build up of glue causing the inaccurate thickness measurements.

Figure 4:
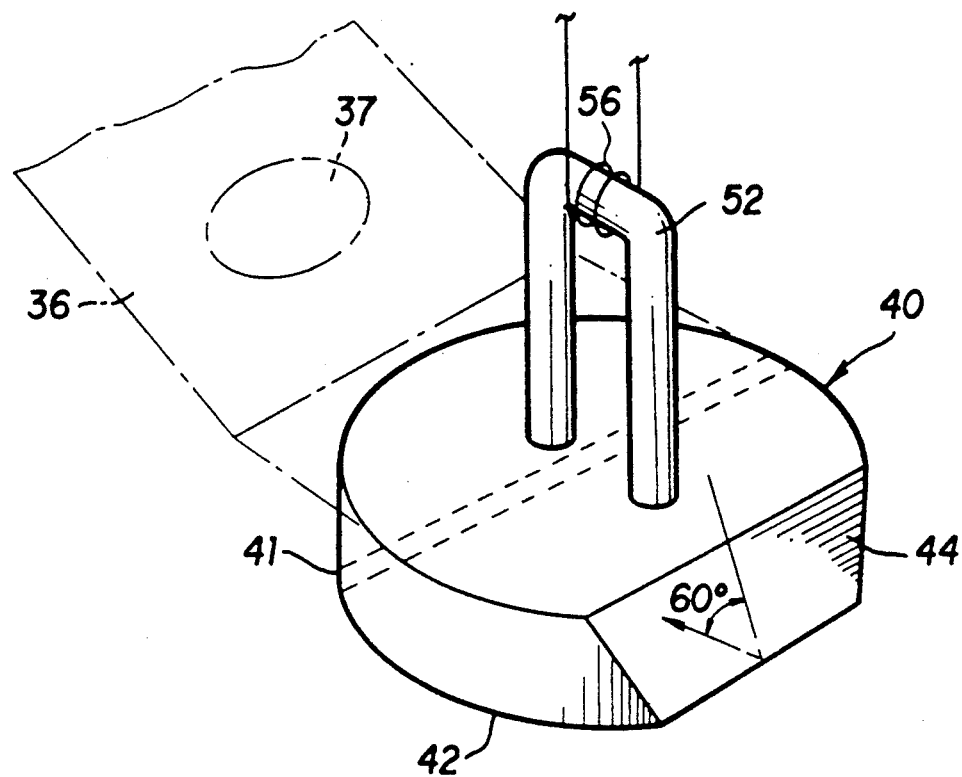
FIG. 4 illustrates, in perspective, the tapered caliper pad having a substantially planar cross-directional surface at the rear end of the pad and an air pressure vent hole in the supporting arm.

FIG. 4 illustrates one tapered pad design 40. The pad 40 is generally circular and may be 0.75 inch in diameter measured along the cross-direction of the pad by 0.03 inch thick. The front of the pad 40 is illustrated with a two degree inclined surface 41 measured relative to the plane of the sheet. Instead of a flat inclined surface, this front portion of the pad 42 may be rounded having a radius of 0.03 inch. The sheet contacting surface is smooth and flat. The pad 40 has a substantially planar cross-directional surface 44 on the side of the pad facing away from the sheet at the rear end of the pad.

Figure 2B:
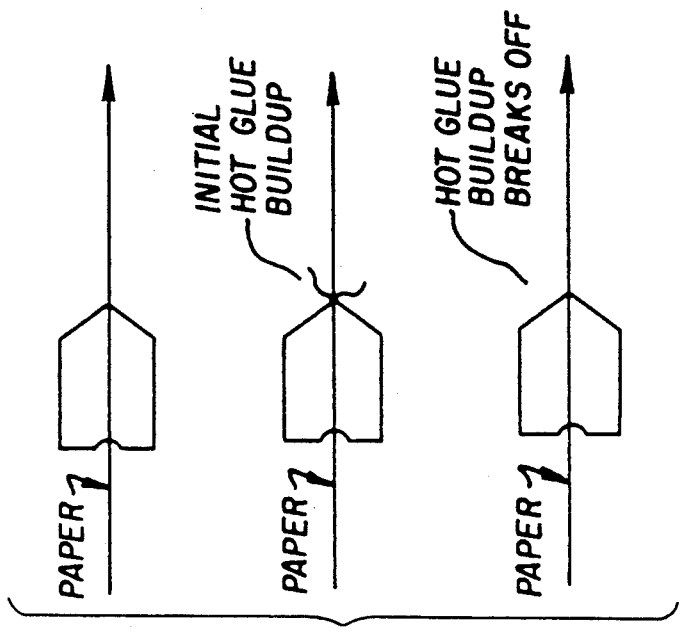
FIGS. 2a and 2b are schematic views illustrating the build up of hot glue on a conventional caliper pad and on a tapered caliper pad according to the present invention. Time increases toward the lower portion of each figure.
Figure 2A:
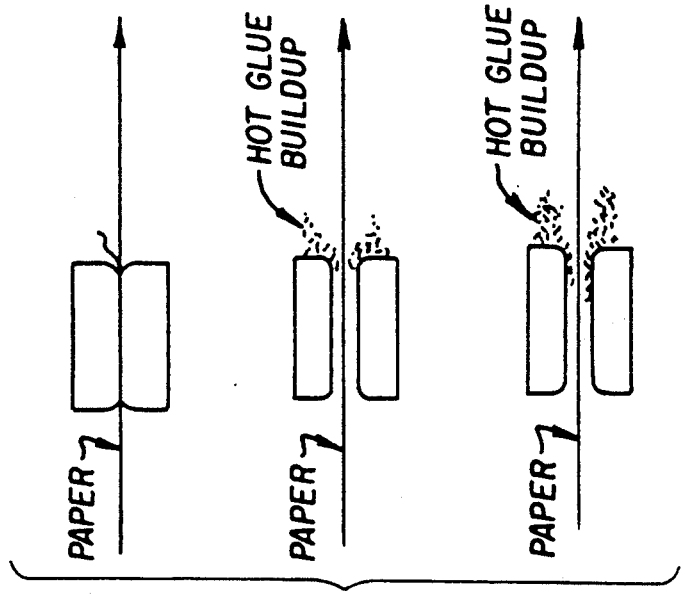

As previously discussed, recycled paper is manufactured at temperatures at which the hot glue begins to solidify. FIG. 2a illustrates a problem with conventional caliper pads in this situation. As the sheet passes between conventional pads, the glue initially adheres to the smoothly rounded trailing end of the pads, providing a slight obstruction to which more glue adheres. Additional glue then begins to adhere upstream of the obstruction on the sheet contacting surface of the pads, eventually occupying the contacting surface and lifting the pads off of the sheet, thereby producing erroneous thickness measurements.

In the tapered caliper pad design of FIG. 4, the glue can only initially adhere, if at all, to the sharp trailing edge of the pad. Before additional glue can adhere to the obstruction provided by it, the increased pressure exerted by the rear portion of the pad creates sufficient frictional force with the sheet to sweep the initial build up away (see FIG. 2b). The sharp trailing edge of the pad further acts to limit build up by reducing the surface area where initial glue build up can escape the effect of this frictional force. FIGS. 2a and 2b illustrate the build up of hot glue over time on a conventional caliper pad and on a tapered caliper pad, respectively. The net result is that the tapered caliper design of FIG. 4 reduces or eliminates the tendency for glue to build up on the sheet contacting surfaces of the pads during the production of certain grades of recycled paper containing glue.

In caliper pads of the type illustrated in FIG. 4, the cross-directional surface 44 and the sheet contacting surface 42 can form an angle of about 90 degrees or less, but will preferably form an angle anywhere between 30–90 degrees (inclusive). However, anything less than 55 degrees may tend to cause the rear end of the pad to break off during operation, because of the brittle nature of the abrasion resistant material used for caliper pads. Favorable results have been achieved when this angle is 60 degrees, as shown. In FIG. 4, the cross-directional surface 44 also shortens the overall machine direction length of the sheet contacting surface to 5/6 the original diameter of a conventional circular caliper pad. However, the exact angle and location of the cross-directional surface 44 may be varied for use in different manufacturing situations to achieve the desired effect. We have found that a simple method of creating the cross-directional surface 44 is by grinding the rear end of a conventional caliper pad with a diamond grit wheel oriented to achieve the desired angle.

Figure 5:
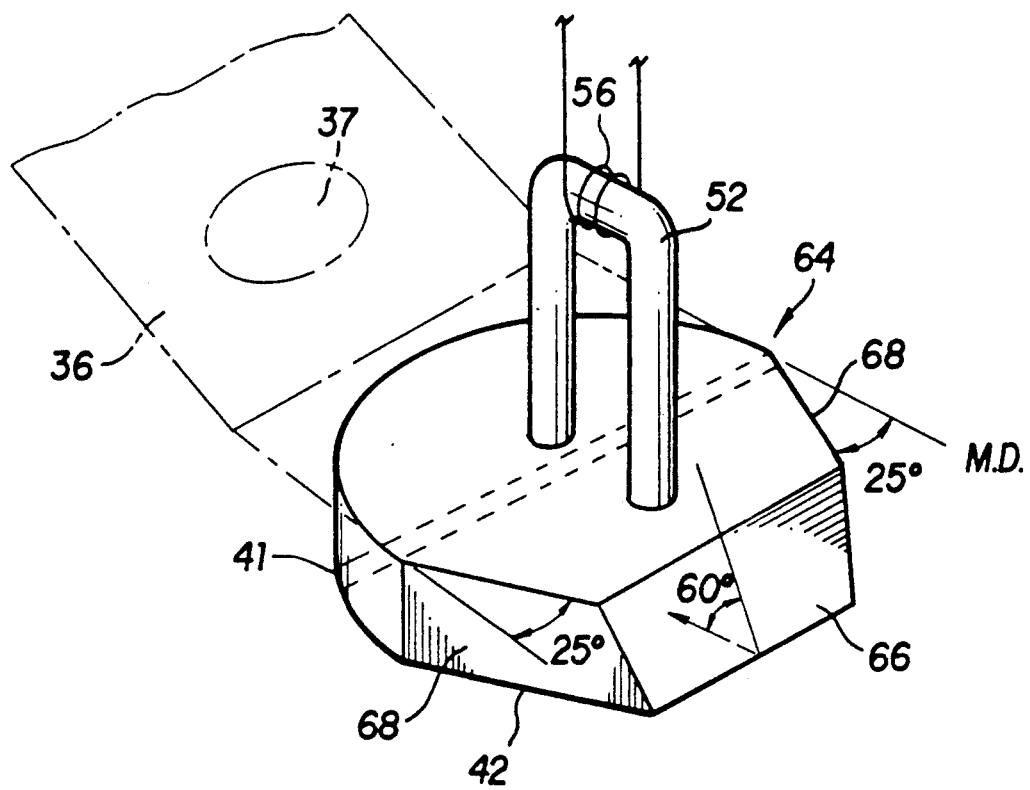
FIG. 5 illustrates, in perspective, a preferred design of the tapered caliper pad having both a cross-directional surface at the rear end of the pad and tapered side surfaces.

FIG. 5 illustrates, in perspective, a preferred design for the tapered pad 64. According to this design, the pad 64 having a cross-directional surface 66 is also tapered on both sides beginning at a location spaced from the rear end of the pad so that the cross-directional width of the pad decreases in size from that location to the rear end of the pad. Each tapered side surface 68 of the pad 64 can preferably form an angle anywhere between about 15–35 degrees with respect to the machine direction (or "M.D."), as shown in FIG. 5. However, favorable results have been achieved when the angle is 25 degrees. Although the taper can begin anywhere along the pad, favorable results have been achieved when the taper begins 0.35 inch from the front-most edge of a generally circular caliper pad having a 0.75 inch diameter. This embodiment provides still another technique to further reduce the surface area of the sheet contacting surface located to the rear of the centerline of force transmitted through the bellows.

In operation, the sheet 14 is threaded between the opposing caliper heads 24, 26 and the central paper mill process control computer 30 instructs the scanning station 12 to begin scanning the caliper gauge 10 back and forth along the cross-direction of the sheet 14. The bellows 38, 50 are pressurized to place the pads in forcible opposing contact with the sheet 14. A pressure of about 10–20 inches of water (gauge) in 1 inch diameter bellows will provide sufficient pressure to maintain the pads of FIG. 4 in contact or very close proximity (less than about 2 microns) to the sheet over a relatively wide range of sheet speeds. A pressure of about 8–18 inches of water (gauge) in the same size bellows will suffice to maintain the pads of FIG. 5 in contact or in very close proximity with the sheet over a relatively wide range of sheet speeds. Of course, higher bellows pressures may be used with stronger, less easily damaged sheets. Sheet caliper measurements are performed by the proximity sensing electronics, as discussed above.

Two preferred embodiments of the present invention have been described. Nevertheless, it will be understood that various modifications may be made without departing from the spirit and scope of the invention. For example, although the caliper pads have been described as having a cross-directional surface at the rear end and/or tapered side surfaces, many shapes where the area of the rear portion of the sheet contacting surface is less than the area of the front portion (relative to the centerline of force applied to the pad) will create a differential pressure limiting the formation of glue build up and is well within the scope of this invention. Moreover, the present invention is not limited to use with paper sheets nor to use with electro-magnetic proximity sensing devices. Other sheet material and other proximity sensing devices may be used. Further-more, physical characteristics of the sheet other than thickness may be measured with the disclosed invention. Thus, the present invention is not limited to the preferred embodiments described herein, but may be altered in a variety of ways which will be apparent to persons skilled in the art.

We claim:

1. A sheet contact pad having a front end and a rear end, a first side and a second side, each side extending from the front end to the rear end, a planar sheet contacting surface adapted for sliding contact with a sheet moving by the pad in a machine direction from the front to the rear end and an opposing surface, the sheet contacting surface extending from a location spaced from the rear end to the rear end of the pad, the pad being tapered from a location spaced from the rear end to the rear end of the pad, the tapering of the pad defining at least one substantially planar surface.

2. The sheet contact pad of claim 1, wherein the opposing surface includes a cross-directional surface which tapers toward the sheet contacting surface at the rear end of the pad.

3. The sheet contact pad of claim 2, wherein the cross-directional surface is substantially planar.

4. The sheet contact pad of claim 3, wherein the cross-directional surface and the sheet contacting surface form an angle between 30-90 degrees at the rear end of the pad.

5. The sheet contact pad of claim 3, wherein the cross-directional surface and the sheet contacting surface form an angle of 60 degrees at the rear end of the pad.

6. The sheet contact pad of claim 1, wherein the pad is tapered on the first and second side beginning at the location spaced from the rear end of the pad so that the cross-directional width of the pad decreases from the location to the rear end of the pad.

7. The sheet contact pad of claim 6, wherein each tapered side of the pad forms an angle of 15-35 degrees with respect to the machine direction.

8. The sheet contact pad of claim 6, wherein each tapered side of the pad forms an angle of 25 degrees with respect to the machine direction.

9. The sheet contact pad of claim 6, wherein the pad is tapered on the opposing surface by a substantially planar cross-directional surface at the rear end of the pad.

10. The sheet contact pad of claim 9, wherein the cross-directional surface and the sheet contacting surface form an angle of 30-90 degrees with respect to the sheet contacting surface at the rear end of the pad and each tapered side forms an angle of 15-35 degrees with respect to the machine direction.

11. The sheet contact pad of claim 9, wherein the cross-directional surface and the sheet contacting surface form an angle of 60 degrees with respect to the sheet contacting surface at the rear end of the pad and each tapered side forms an angle of 25 degrees with respect to the machine direction.

12. A sheet contact pad having a front end and rear end, the rear end defining a cross-directional surface, a first side and a second side, each side extending from the front end to the rear end, a planar sheet contacting surface adapted for sliding contact with a sheet moving by the pad in a machine direction from the front end to the rear end of the pad and an opposing surface, the sheet contacting surface extending from a location spaced from the rear end to the rear end, wherein the cross-directional surface and the sheet contacting surface form an angle of less than 90 degrees with respect to the sheet contacting surface at the rear end of the pad to reduce build up of material on the sheet contacting surface.

13. The sheet contact pad of claim 12, wherein the cross-directional surface and the sheet contacting surface form an angle of at least 30 degrees with respect to the sheet contacting surface at the rear end of the pad.

14. The sheet contact pad of claim 12, wherein the cross-directional surface and the sheet contacting surface form an angle of 60 degrees with respect to the sheet contacting surface at the rear end of the pad.

15. The sheet contact pad of claim 12, wherein the pad is tapered on each side beginning at a location spaced from the rear end of the pad so that the cross-directional width of the pad decreases from the location to the rear end of the pad.

16. The sheet contact pad of claim 15, wherein each tapered side of the pad forms an angle of 15-35 degrees with respect to the machine direction.

17. The sheet contact pad of claim 15, wherein each tapered side of the pad forms an angle of 25 degrees with respect to the machine direction.

18. The sheet contacting pad of claim 15, wherein the cross-directional surface and the sheet contacting surface form an angle of at least 30 degrees with respect to the sheet contacting surfaces at the rear end of the pad and each tapered side forms an angle of 15-35 degrees with respect to the machine direction.

19. The sheet contact pad of claim 15, wherein the cross-directional surface and the sheet contacting surface form an angle of 60 degrees with respect to the sheet contacting surface at the rear end of the pad and each tapered side surface forms an angle of 25 degrees with respect to the machine direction.

20. A sheet contact pad having a front and a rear end, a sheet contacting surface adapted for sliding contact with a sheet moving by the pad in a machine direction from the front end to the rear end of the pad, and an opposing surface, wherein the sheet contacting surface extends from a location spaced from the rear end to the rear end and the opposing surface further defining a cross-directional surface which is tapered toward sheet contacting surface at the rear end of the pad and forms a sharp edge at the intersection between the sheet contacting surface and the cross-directional surface.

21. The sheet contact pad of claim 20, wherein the sheet contacting surface defines a plane for contact with a sheet, the sheet contacting surface and the cross-directional surface forming the sharp edge in the plane.

22. A caliper gauge for measuring a physical property of a sheet material moving by the gauge in a machine direction, the gauge comprising:
a base;
an extendible member having one end connected to the base; and
a pad having a front end and a rear end, the rear end defining a cross-directional surface and a first side and a second side, each side extending from the front end to the rear end, a planar sheet contacting surface adapted for sliding contact with the sheet and an opposing surface, the opposing surface connected to the end of the extendible member opposite the base, the sheet contacting surface and the cross-directional surface forming an angle of less than 90 degrees with respect to the sheet contacting surface at the rear end of the pad to reduce build up of material on the sheet contacting surface.

23. The caliper gauge of claim 22, wherein the sheet contacting surface and the cross-directional surface form an angle of at least 30 degrees with respect to the sheet contacting surface at the rear end of the pad.

24. The caliper gauge of claim 22, wherein the sheet contacting surface and the cross-directional surface form an angle of 60 degrees with respect to the sheet contacting surface at the rear end of the pad.

25. The caliper gauge of claim 22, wherein the pad is tapered on the first and second side beginning at the location spaced from the rear end of the pad so that the cross-directional width of the pad decreases from the location to the rear end of the pad.

26. The caliper gauge of claim 25, wherein each tapered side of the pad forms an angle of 15-35 degrees with respect to the machine direction.

27. The caliper gauge of claim 25, wherein each tapered side of the pad forms an angle of 25 degrees with respect to the machine direction.

28. The caliper gauge of claim 25, wherein the sheet contacting surface and the cross-directional surface form an angle of at least 30 degrees with respect to the sheet contacting surface at the rear end of the pad and each tapered side forms an angle of 15-35 degrees with respect to the machine direction.

29. The caliper gauge of claim 25, wherein the the sheet contacting surface and the cross-directional surface form an angle of 60 degrees with respect to the sheet contacting surface at the rear end of the pad and each tapered side forms an angle of 25 degrees with respect to the machine direction.

30. A caliper gauge for measuring a physical property of a sheet material moving by the gauge in a machine direction, the gauge comprising:
a base;
an extendible member having one end connected to the base, wherein the extendible member is operable to exert a force in the direction opposite the base; and
a pad having a front end and a rear end, a planar sheet contacting surface adapted for sliding contact with a sheet moving by the pad in a machine direction from the front to the rear end and an opposing surface, the opposing surface being connected to the end of the extendible member opposite the base, so that the rear portion of the sheet contacting surface exerts a greater pressure on the moving sheet than the front portion.

31. The caliper gauge of claim 30, wherein an area of the front portion of the sheet contacting surface is greater than the rear portion, with respect to the centerline of force exerted by the extendible member.

32. The caliper gauge of claim 31, wherein the front portion of the sheet contacting surface has a greater machine directional length than the rear portion.

33. The caliper gauge of claim 31, wherein the pad is tapered on the first and second side beginning at the location spaced from the rear end of the pad so that the cross-directional width of the pad decreases from the location to the rear end of the pad.

34. The caliper gauge of claim 33, wherein each tapered side of the pad forms an angle of 15-35 degrees with respect to the machine direction.

35. The caliper gauge of claim 33, wherein each tapered side of the pad forms an angle of 25 degrees with respect to the machine direction.

36. A system for measuring a moving sheet, comprising:
a first pad having a front end and a rear end, the rear end defining a cross-directional surface, a planar sheet contacting surface adapted for sliding contact with the sheet and an opposing surface, wherein the cross-directional surface and the sheet contacting surface of the first pad form an angle of less than 90 degrees with respect to the sheet contacting surface at the rear end of the first pad;
a sheet moving from the front to the rear of the first pad and having first and second sheet surfaces on opposite sides of the sheet, the first surface of the moving sheet located adjacent to the sheet contacting surface of the first pad; and
a second pad having a front end and a rear end, the rear end defining a cross-directional surface, a planar sheet contacting surface adapted to sliding contact with the sheet and an opposing surface, the sheet contacting surface of the second pad located adjacent to the second surface of the moving sheet, wherein the cross-directional surface and the sheet contacting surface of the second pad form an angle of less than 90 degrees with respect to the sheet contacting surface at the rear end of the second pad.

* * * * *